(12) United States Patent
Suzuki et al.

(10) Patent No.: US 7,320,079 B2
(45) Date of Patent: Jan. 15, 2008

(54) SEMICONDUCTOR INTEGRATED CIRCUIT DEVICE, AN ELECTRONIC APPARATUS INCLUDING THE DEVICE, AND A POWER CONSUMPTION REDUCTION METHOD

(75) Inventors: Takaaki Suzuki, Kawasaki (JP); Yukinori Kodama, deceased, late of Mihara (JP); by Sumie Kodama, legal representative, Mihara (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/499,721

(22) Filed: Aug. 7, 2006

(65) Prior Publication Data

US 2006/0271807 A1 Nov. 30, 2006

Related U.S. Application Data

(60) Division of application No. 10/829,938, filed on Apr. 23, 2004, which is a continuation of application No. PCT/JP01/09445, filed on Oct. 26, 2001.

(51) Int. Cl.
G06F 1/00 (2006.01)
G06F 1/26 (2006.01)
G06F 1/32 (2006.01)
(52) U.S. Cl. ...................... 713/300; 713/320
(58) Field of Classification Search ........... 713/300, 713/320, 322, 323; 345/536
See application file for complete search history.

(56) References Cited

U.S. PATENT DOCUMENTS

| | | | |
|---|---|---|---|
| 5,086,238 A | 2/1992 | Watanabe et al. | |
| 5,602,792 A | 2/1997 | Kanaishi | |
| 5,612,920 A | 3/1997 | Tomishima | |
| 6,128,747 A | 10/2000 | Thoulon | |
| 6,141,762 A * | 10/2000 | Nicol et al. | 713/300 |
| 6,259,459 B1 * | 7/2001 | Middleton | 345/536 |
| 6,301,184 B1 | 10/2001 | Sasaki et al. | |
| 6,380,799 B1 | 4/2002 | Chung et al. | |
| 6,938,176 B1 * | 8/2005 | Alben et al. | 713/323 |
| 7,100,061 B2 * | 8/2006 | Halepete et al. | 713/322 |
| 2002/0038435 A1 | 3/2002 | Akamatsu | |

FOREIGN PATENT DOCUMENTS

| | | |
|---|---|---|
| JP | 58-171842 A | 10/1983 |
| JP | 63-65714 A | 3/1988 |
| JP | 63-104443 A | 5/1988 |
| JP | 63-229692 A | 9/1988 |
| JP | 2-39559 A | 2/1990 |
| JP | 05-036934 A | 2/1993 |
| JP | 10-228340 A | 8/1998 |
| JP | 2001-185689 A | 7/2001 |

* cited by examiner

*Primary Examiner*—Thomas Lee
*Assistant Examiner*—Michael Wang
(74) *Attorney, Agent, or Firm*—Arent Fox LLP

(57) ABSTRACT

A semiconductor integrated circuit is disclosed that operates in synch with a clock signal supplied from an external source, and by a voltage supplied by a power supply. The circuit includes a detection means for detecting that at least one of a frequency of the clock signal and the supply voltage is reduced, and an internal voltage reduction means for lowering an internal voltage of the semiconductor integrated circuit when the detection means detects that at least one of the frequency and the supply voltage is lowered.

9 Claims, 15 Drawing Sheets

SEMICONDUCTOR INTEGRATED CIRCUIT DEVICE, AN ELECTRONIC APPARATUS INCLUDING THE DEVICE, AND A POWER CONSUMPTION REDUCTION METHOD

CROSS-REFERENCE TO RELATED APPLICATION

This application is a Divisional of U.S. patent application Ser. No. 10/829,938 filed Apr. 23, 2004, which is a Continuation Application of and claims the benefit of International Application No. PCT/JP01/09445 filed Oct. 26, 2001. The disclosures of the prior applications are hereby incorporated in their entirety by reference.

TECHNICAL FIELD

The present invention generally relates to a semiconductor integrated circuit device, and electronic apparatuses that include the semiconductor integrated circuit device, such as a portable apparatus, and particularly relates to technology for reducing power consumption.

BACKGROUND TECHNOLOGY

At present, reduction of power consumption is required of portable apparatuses, such as portable telephones, notebook computer type apparatuses, and palmtop computer type apparatuses.

FIG. 1 shows an example how a portable apparatus according to conventional technology is configured. The portable apparatus shown therein includes a memory 10 consisting of DRAMs, a DRAM controller 20, an image-processing unit (IP: image processor) 30, a central processing unit (CPU) 40, an interface 50, and a system power circuit 60. The IP 30 and the CPU 40 can simultaneously access the memory 10 through the DRAM controller 20. That is, the IP 30 and the CPU 40 share a data bus and a command bus (data/command bus) 70. The IP 30 and the CPU 40 transmit and receive data to and from an external apparatus, which is not illustrated, through the interface 50 that is connected to an external I/O terminal.

The CPU 40 controls the system power circuit 60 by a power control signal A. The system power circuit 60 supplies power to the internal circuit of the portable apparatus. In FIG. 1, a power supply path to a peripheral circuit 11b of a memory core 11d of the memory 10 is illustrated, for example. When, for example, the portable apparatus is put to a resume mode (stand-by mode, idle status), the CPU 40 outputs the power control signal A to the system power circuit 60 such that the internal circuit including the memory 10 is put to a low-power mode. The memory 10 that is put to the low-power mode is supplied with necessary minimum power required in order that the peripheral circuit 11b keeps operating, and power consumption is reduced.

As mentioned above, the IP 30 and the CPU 40 can simultaneously access the memory 10. Accordingly, in order to share the memory 10, the access rate should be twice as high as the case wherein the IP 30 and the CPU 40 independently access the memory 10. For example, when the independent access rate of each the IP 30 and the CPU 40 is 50 MHz, in order to share the memory 10, an access rate of 100 MHz is required.

While simultaneous access is possible, the IP 30 and the CPU 40 do not necessarily operate (access the memory 10) simultaneously in fact, and often, only the CPU 40 accesses the memory 10. In other words, the operating time of the CPU 40 is greater than the operating time of the IP 30. If there are no data that should be processed, the IP 30 does not perform image processing, but is in an idle status.

Even if the IP 30 is in the idle status, the access rate is not changed. In the above-mentioned example, the access rate remains at 100 MHz. In order for only the CPU 40 to access the memory 10, the access rate can be lowered to 50 MHz. That is, when the IP 30 is in the idle status, power is consumed uselessly. Generally, portable apparatuses operate on rechargeable batteries and dry cells. Therefore, if the IP 30 is in the idle status, built-in battery energy is uselessly consumed, and the operating time of the portable apparatus becomes short.

The problem is similarly applicable to systems that share a memory between two or more units and circuits.

THE DISCLOSURE OF THE INVENTION

Accordingly, the general object of the present invention is to comprehensively solve the above-mentioned problem of the conventional technology.

Specifically, the present invention aims at offering a semiconductor integrated circuit device, the power consumption of which is reduced, an electronic apparatus incorporating the semiconductor integrated circuit device, and a method of reducing the power consumption.

In order to attain the objects, the semiconductor integrated circuit device that operates on a supply voltage provided by a power supply, and in synch with a clock signal provided from outside, according to the present invention includes detection means for detecting that at least one of a frequency of the clock signal and the supply voltage is lowered, and means for reducing an internal voltage of the semiconductor integrated circuit device and/or for delaying operations timing, when the detection means detects that at least one of the clock frequency and the supply voltage is lowered.

The semiconductor integrated circuit device is provided with the detection means for detecting that at least one of the clock frequency and the supply voltage is lowered, and carries out operations for autonomously reducing the power consumption, i.e., reducing the internal voltage of the above-mentioned semiconductor integrated circuit device and/or for delaying the operations timing, when the detection means detects that at least one of the clock frequency and the supply voltage is lowered. Therefore, power consumption is effectively reduced.

BRIEF EXPLANATION OF THE DRAWINGS

Other objects, features, and advantages of the present invention will become still clearer by reading the following explanation with reference to the attached drawings.

DESCRIPTION OF THE PREFERRED EMBODIMENTS

First, some of the features of the present invention are enumerated as follows.

The present invention provides means for adjusting the frequency of a clock signal (the system clock signal) of a bus and the like, and means for adjusting a voltage provided for system power inside of a memory and the like. For example, where a system includes two or more information processors, such as a CPU (central processing unit) and an IP (image processor) that access the memory through a common bus, an idle state of any one of the information processors or a part thereof is detected, and the frequency of the system clock signal for the memory and the information processors is lowered.

Further, when any of the information processors, or a part thereof, is determined to be in an idle state, the internal voltage supplied to a memory cell array, a voltage for system power, etc., are reduced. Furthermore, according to the configuration of the present invention, the internal voltage supplied to the memory cell array is further reduced by delaying the start timing of reading and writing compared with normal operations.

Furthermore, the present invention is configured such that the substrate voltage of the memory is raised when the system power voltage is lowered. This is to cope with the situation wherein the threshold of transistors, especially NMOS transistors, in the memory is raised when the system power voltage is lowered.

Hereafter, preferred embodiments that realize the above-described features are explained in detail referring to the attached drawings.

The First Embodiment

The first of the preferred embodiments of the present invention is explained in detail referring to the attached drawings.

Figure 1:
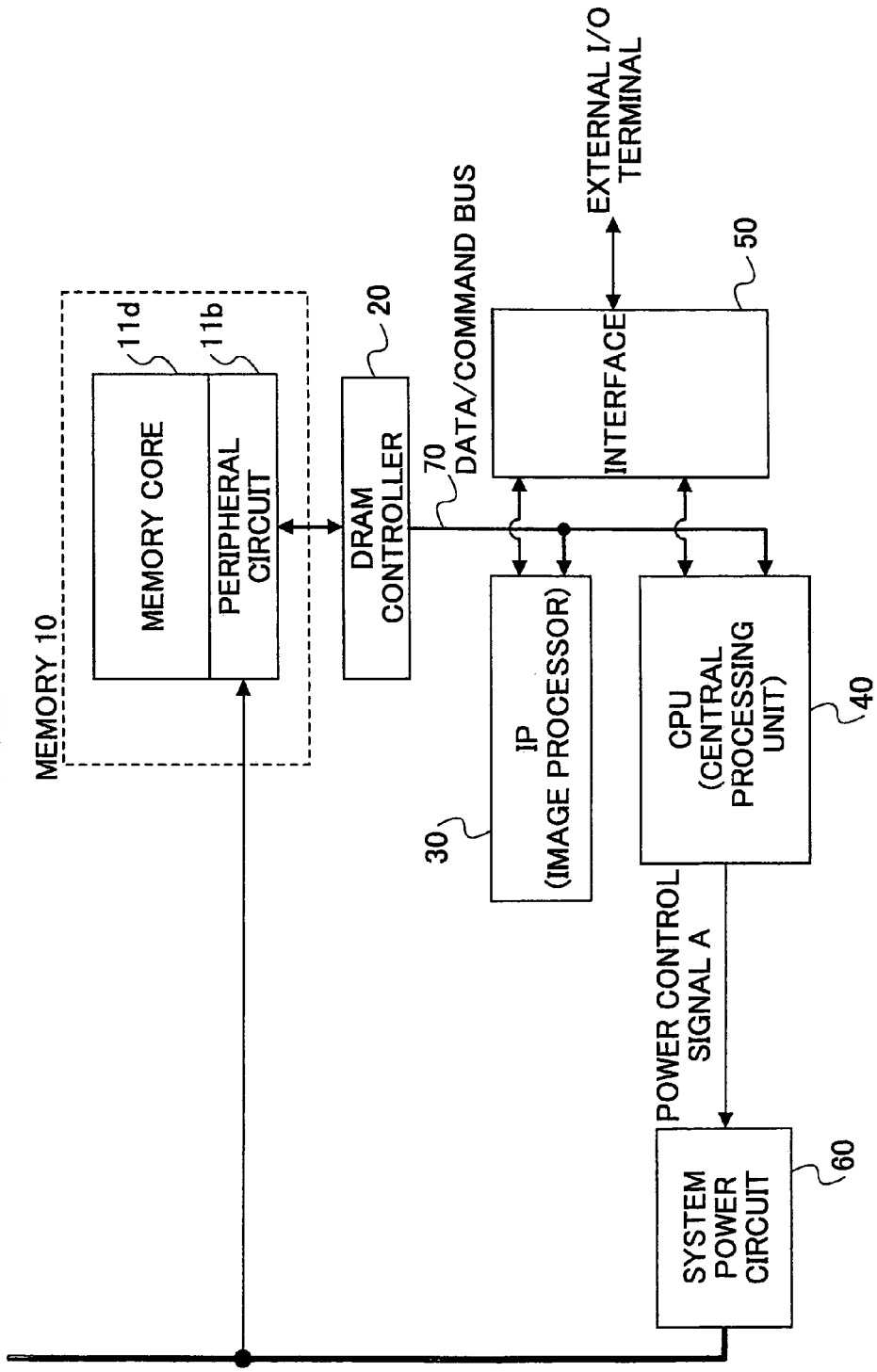
FIG. 1 is a block diagram showing the internal basic configuration of a portable apparatus according to the conventional technology.
Figure 2:
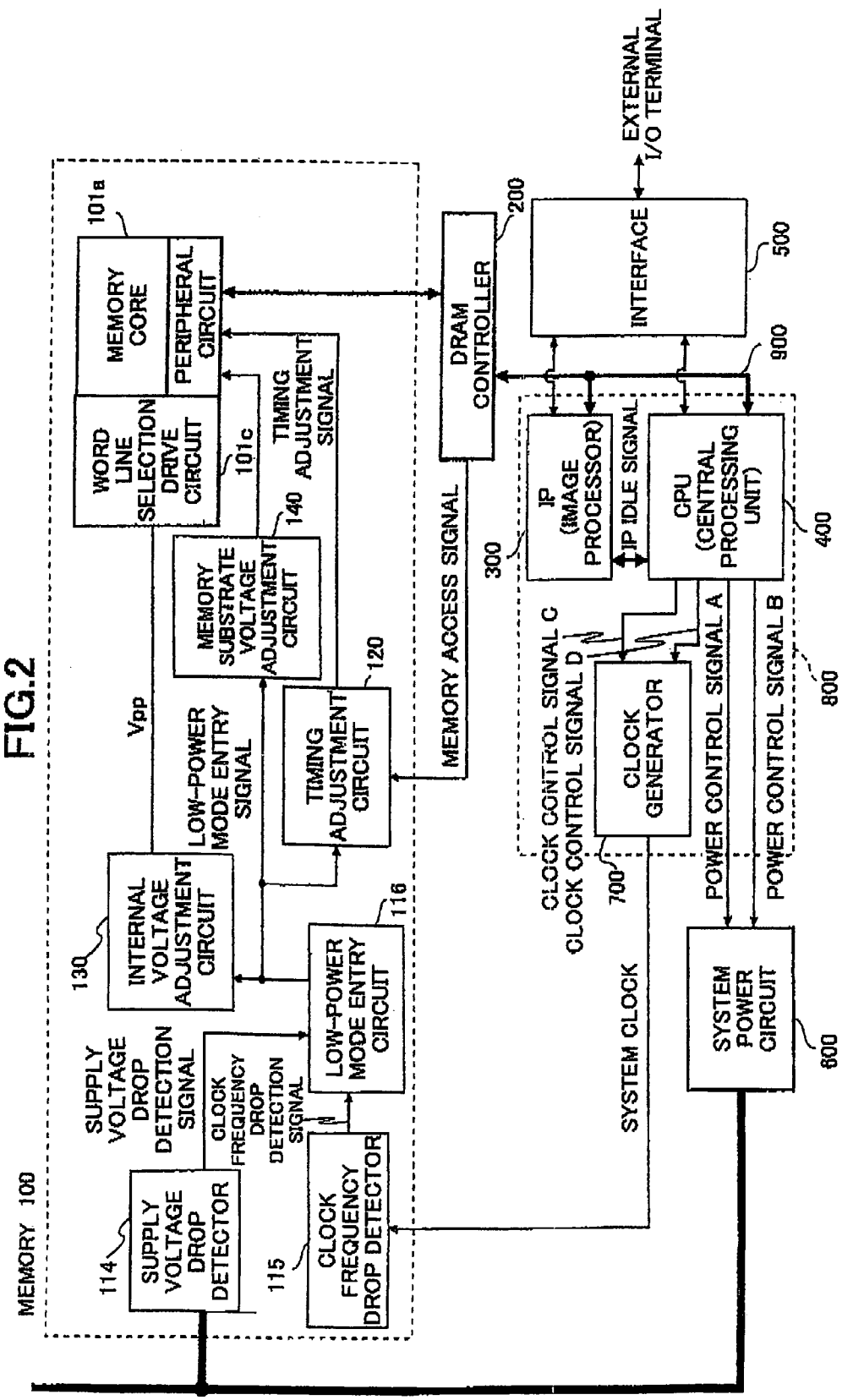
FIG. 2 is a block diagram showing a configuration of a first embodiment of the present invention.

FIG. 2 is a block diagram showing the first embodiment of the present invention, which drawing shows the configuration of a semiconductor integrated circuit device, and an electronic apparatus incorporating the semiconductor integrated circuit device.

The electronic apparatus of the first embodiment shown in FIG. 2 includes a memory 100 consisting of memory devices, such as SDRAM (synchronous type DRAM), a DRAM controller 200, a control unit 800, an interface 500, and a system power circuit 600. The electronic apparatus is equivalent to, for example, a card that is provided with these parts on a circuit board; and a cellular phone, a personal computer, and the like that are provided with these parts, and a circuit board. The memory 100 is an example of the semiconductor integrated circuit device of the present invention. The control unit 800 includes an image processor (IP) 300, a CPU 400, and a clock generator 700. The IP 300 and the CPU 400 share the memory 100 through a data command bus 900 and the DRAM controller 200. The clock generator 700 supplies a system clock signal to the memory 100.

One of the features of the embodiment is lowering the frequency of the system clock signal and the supply voltage that are provided to the memory 100, when the IP 300 is in the idle status. Another feature of the embodiment is that the memory 100 detects the drop of the frequency of the system clock signal and the drop of the supply voltage, and autonomously shifts to a low-power operation mode.

Hereafter, the embodiment is explained in detail.

Lowering/Resuming the System Power/System Clock Signal Frequency

According to the embodiment, lowering the system clock signal frequency and the system power voltage, and resuming the system clock signal frequency and the system power voltage for normal operations are controlled by a signal that is output from the CPU 400.

That is, when lowering the system power voltage and the system clock signal frequency, for example, the CPU 400 outputs a power control signal B to the system power circuit 600, and outputs a clock control signal D to the clock generator 700. When the power control signal B is input, the system power circuit 600 changes the system power voltage to a lower voltage by a predetermined amount. Further, when the clock control signal D is input, the clock generator 700 changes the system clock signal frequency to a predetermined clock frequency, for example, half of the frequency used in normal operations.

Here, the system power circuit 600 is a circuit that supplies a supply voltage to each part of the electronic apparatus, and the clock generator 700 is a circuit that supplies the system clock signal to the internal circuit of the memory 100, and others.

Further, when resuming the system power voltage for normal operations, the CPU 400 outputs a power control signal A to the system power circuit 600, and outputs a clock control signal C to the clock generator 700. The system power circuit 600 changes the system power voltage to the voltage for normal operations, when the power control signal A is input. Further, the clock generator 700 changes the system clock signal to the clock frequency for normal operations when the clock control signal C is input.

Further, the system clock signal may be lowered by a configuration wherein a voltage applied to a crystal oscillator contained in the clock generator 700 is changed, and by a configuration wherein a divider (such as a programmable divider) is provided to the output stage of the clock generator 700, and the dividing ratio is changed. Here, when the dividing ratio of the divider provided to the output stage of the clock generator 700 is changed, the clock control signals C and D output from the CPU 400 are input to this divider.

Further, when reducing the system clock signal, the operation clock of the CPU 400 can be maintained or adjusted to a predetermined operation clock by adjusting a step-up ratio of a step-up circuit of the CPU 400.

Further, according to the embodiment, the change of the system power voltage and the system clock signal frequency is performed based on whether the IP 300 is operating, or in an idle state. That is, according to the embodiment, when the IP 300 is in operation, the system power voltage and the system clock signal frequency are set at values for normal operations, and when the IP 300 is in the idle state, the system power voltage and the system clock signal frequency are lowered from the normal operations values.

Detection of the Operating State/Idle State of the IP 300

The CPU 400 determines whether the IP 300 is in the operating state or in the idle state. This is realized by one of the following configurations, namely (1) the CPU 400 always or periodically (every predetermined cycle) polls the IP 300 for detecting whether the IP 300 is operating or idle; (2) the IP 300 periodically outputs a predetermined signal (IP operating signal/IP idle signal) to the CPU 400 while operating/being idle, respectively; and (3) whenever the IP 300 shifts to the idle state from the operating state, and whenever it shifts to the operating state from the idle state, predetermined corresponding signals are output to the CPU 400. Nevertheless, the configuration is not limited to what is described above, but any other variation may be employed as long as the configuration enables the CPU 400 to detect whether the IP 300 is in operation or in the idle status.

Figure 3:
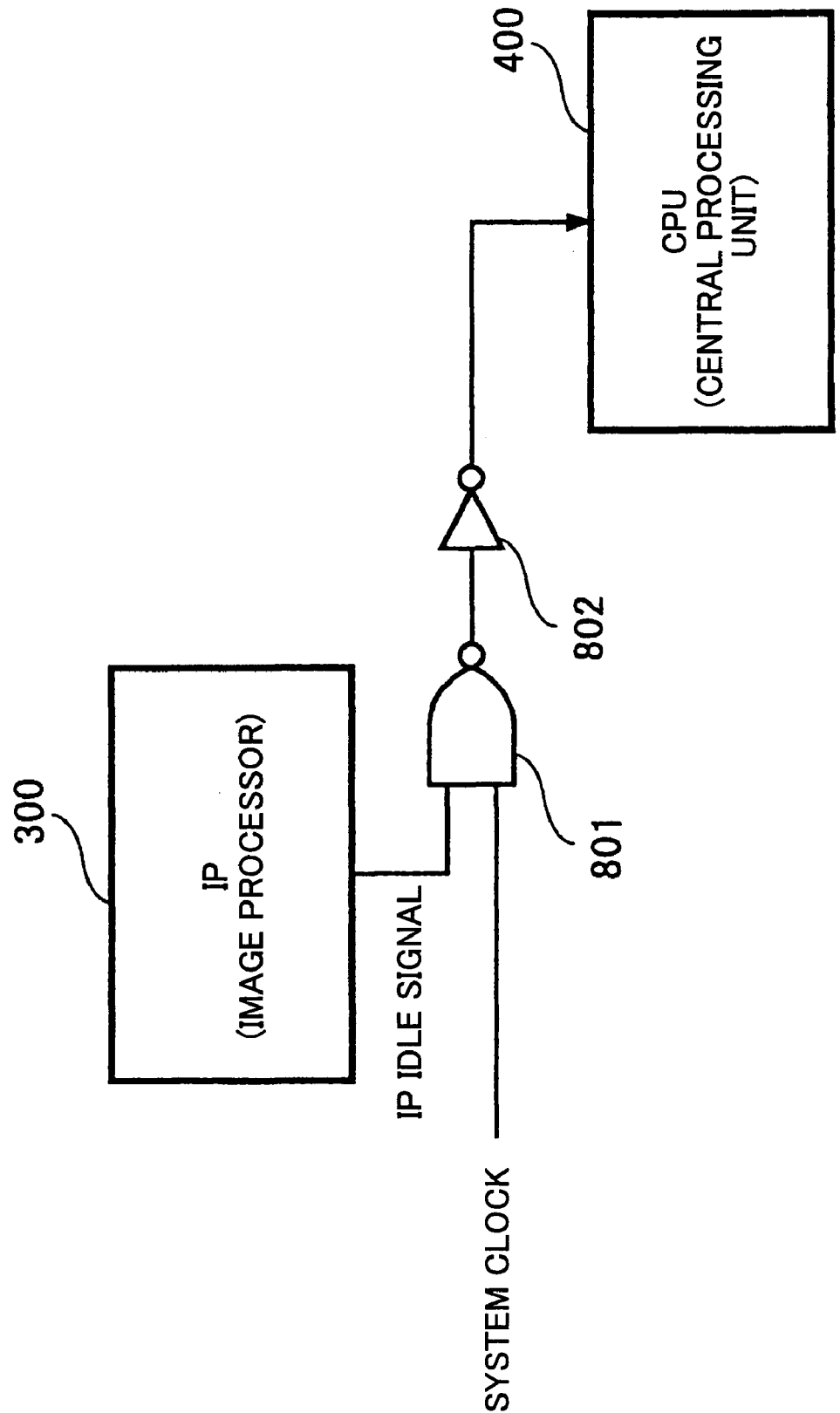
FIG. 3 is a circuit diagram showing a configuration example of a circuit arrangement for detecting whether an IP in the configuration of FIG. 2 is in an idle status.

FIG. 3 shows an example of the configuration for detecting the operating state/idle state of the IP 300. The IP idle state detector shown by FIG. 3 includes a NAND gate 801 and an inverter 802 that are provided between the IP 300 and the CPU 400. The IP 300 always outputs an IP idle signal during the period while the IP 300 is in idle state (high level, or logic 1). While the IP idle signal is output, the output of the NAND gate 801 changes according to the system clock signal, and is supplied to the CPU 400 through the inverter 802. That is, while the IP idle signal is output, the system clock signal continues being supplied to the CPU 400. In this manner, the CPU 400 detects the idle state of the IP 300.

The Change of the Memory Operation Mode

Further, according to the embodiment, when the idle state of the IP 300 is detected as mentioned above, the memory 100 is changed from the normal operation mode to a low-power mode wherein the memory operates at low power. Accordingly, with this embodiment, the power consumption is further reduced. In the following, the case where the change is performed based on detection means prepared in the memory 100 is explained as an example.

The detection means is for detecting the system clock signal frequency being lowered, and the system power voltage being reduced. That is, according to the embodiment, when the CPU 400 detects that the IP 300 enters the idle state, the system power voltage and the system clock signal frequency are lowered, which are then detected by the detection means (equivalent to the supply voltage drop detector 114 and the clock frequency drop detector 115 in FIG. 2) provided in the memory 100, and each circuit (120, 130, and 140) is made to enter the low-power mode.

Hereafter, each circuit is explained in detail referring to the attached drawings.

Supply Voltage Drop Detector 114

First, examples of the configuration and circuit arrangement of the supply voltage drop detector 114 shown by FIG. 2 are explained in detail with reference to sections (a) and (b), respectively, of FIG. 4.

Figure 4:
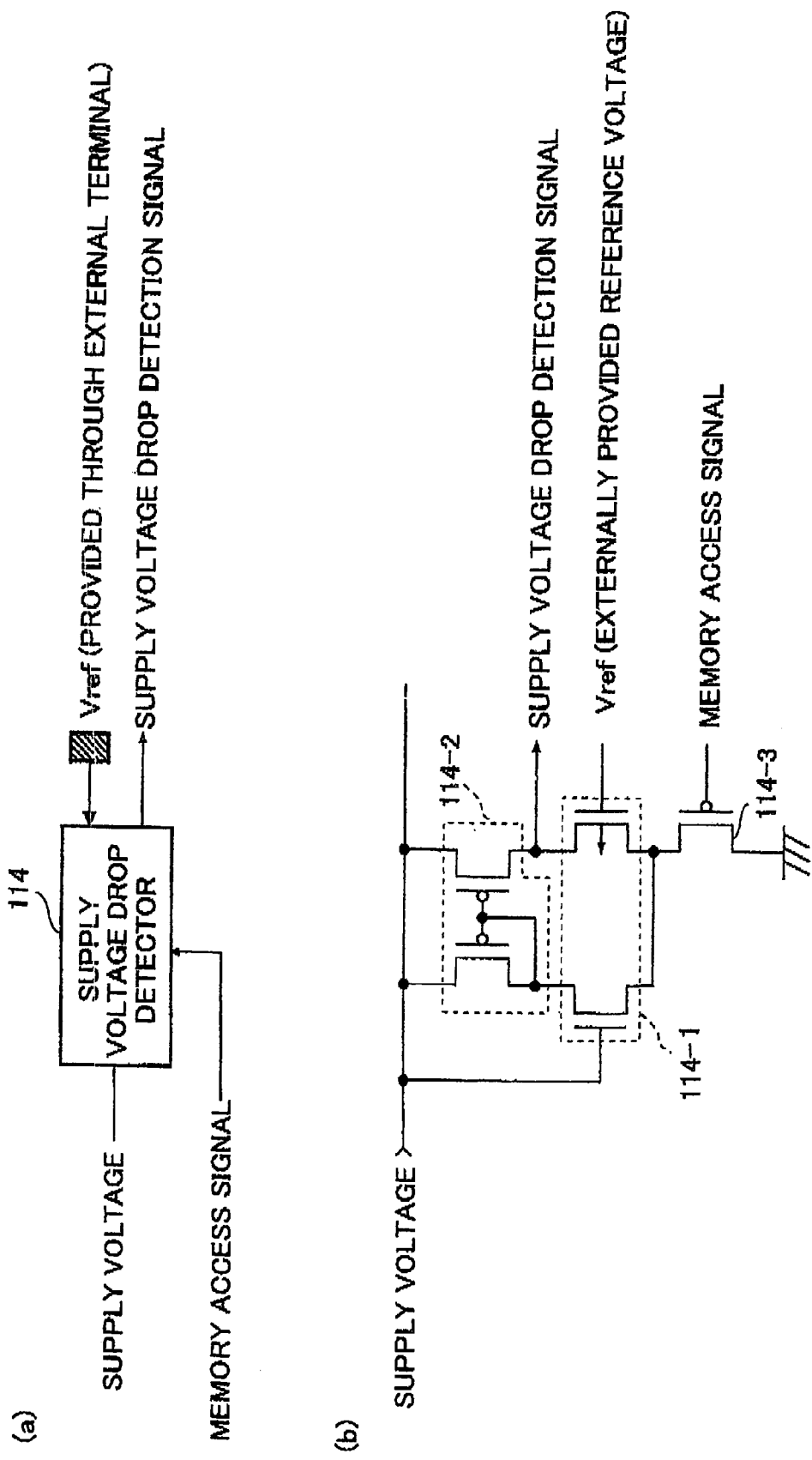
FIG. 4 is a circuit diagram showing a configuration example of a supply voltage drop detector shown in FIG. 2.

At the section (a) of FIG. 4, an example of a block diagram of the supply voltage drop detector 114 is shown, wherein the system power voltage and an external reference voltage Vref are provided to the supply voltage drop detector 114. Further, an example of the circuit arrangement of the supply voltage drop detector 114 is shown at (b) of FIG. 4. As shown at (b) of FIG. 4, the supply voltage detector 114 includes a differential amplifying circuit 114-1, and a current mirror circuit (NMOS transistor) 114-2 serving as a load resistance. In this manner, the supply voltage drop detector 114 of the embodiment outputs a supply voltage drop detection signal when the system power voltage becomes lower than a predetermined voltage. It is preferred that a threshold voltage be set to the gate of the NMOS transistor 114-2, to which Vref is provided, and the supply voltage drop detection signal be output when the system power voltage becomes lower than Vref by an amount equal to the threshold voltage.

Further, as shown by FIG. 4, the supply voltage drop detector 114 includes a PMOS 114-3 on the source side (GND side) of the differential amplifying circuit 114-1, and an inverted memory-access signal is provided to the gate of the PMOS transistor 114-3. In this manner, only when the memory-access signal is input, the supply voltage drop detector 114 is made to operate. That is, the supply voltage drop detector 114 operates only when required, reducing the power consumption.

Clock Frequency Drop Detector 115

Next, the circuit arrangement of the clock frequency drop detector 115 shown by FIG. 2 is explained in detail in reference to FIGS. 5 through 8.

Figure 5:
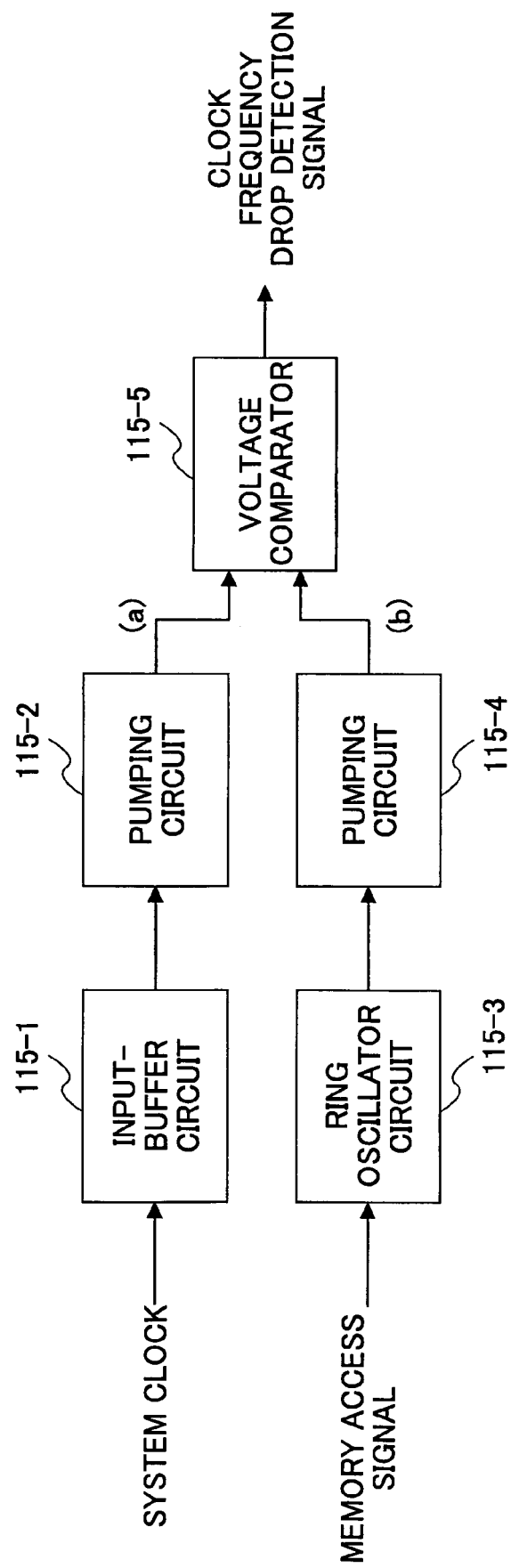
FIG. 5 is a circuit diagram showing a configuration example of a clock frequency drop detector shown in FIG. 2.

FIG. 5 is a block diagram showing a configuration example of the clock frequency drop detector 115. As shown by FIG. 5, the clock frequency drop detector 115 detects whether the system clock signal frequency is lowered by making the memory-access signal a trigger, and the clock frequency drop detection signal is output when it is determined that the system clock signal frequency is lowered.

Figure 6:
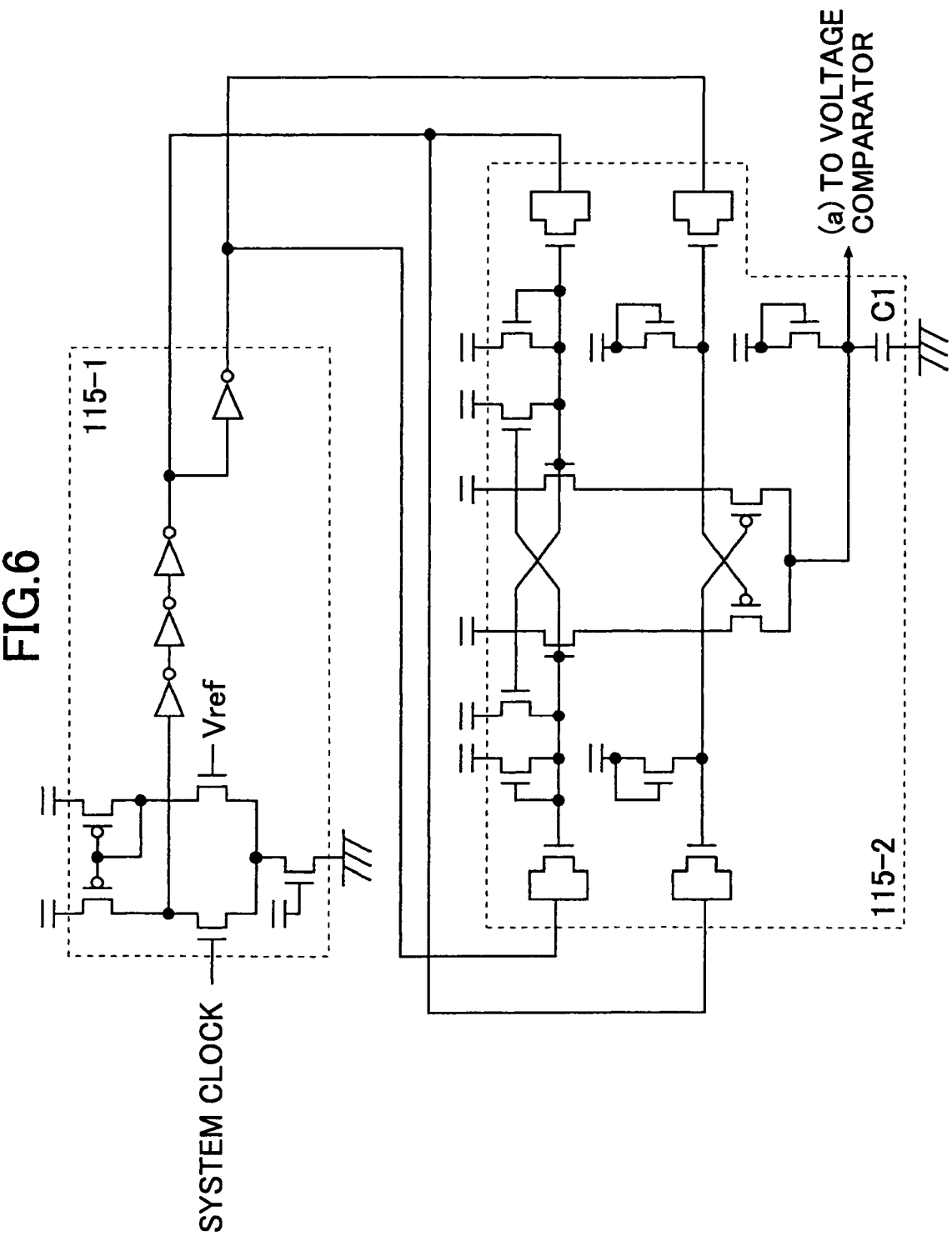
FIG. 6 is a circuit diagram showing a configuration example of an input buffer circuit and a pumping circuit shown in FIG. 5.
Figure 7:
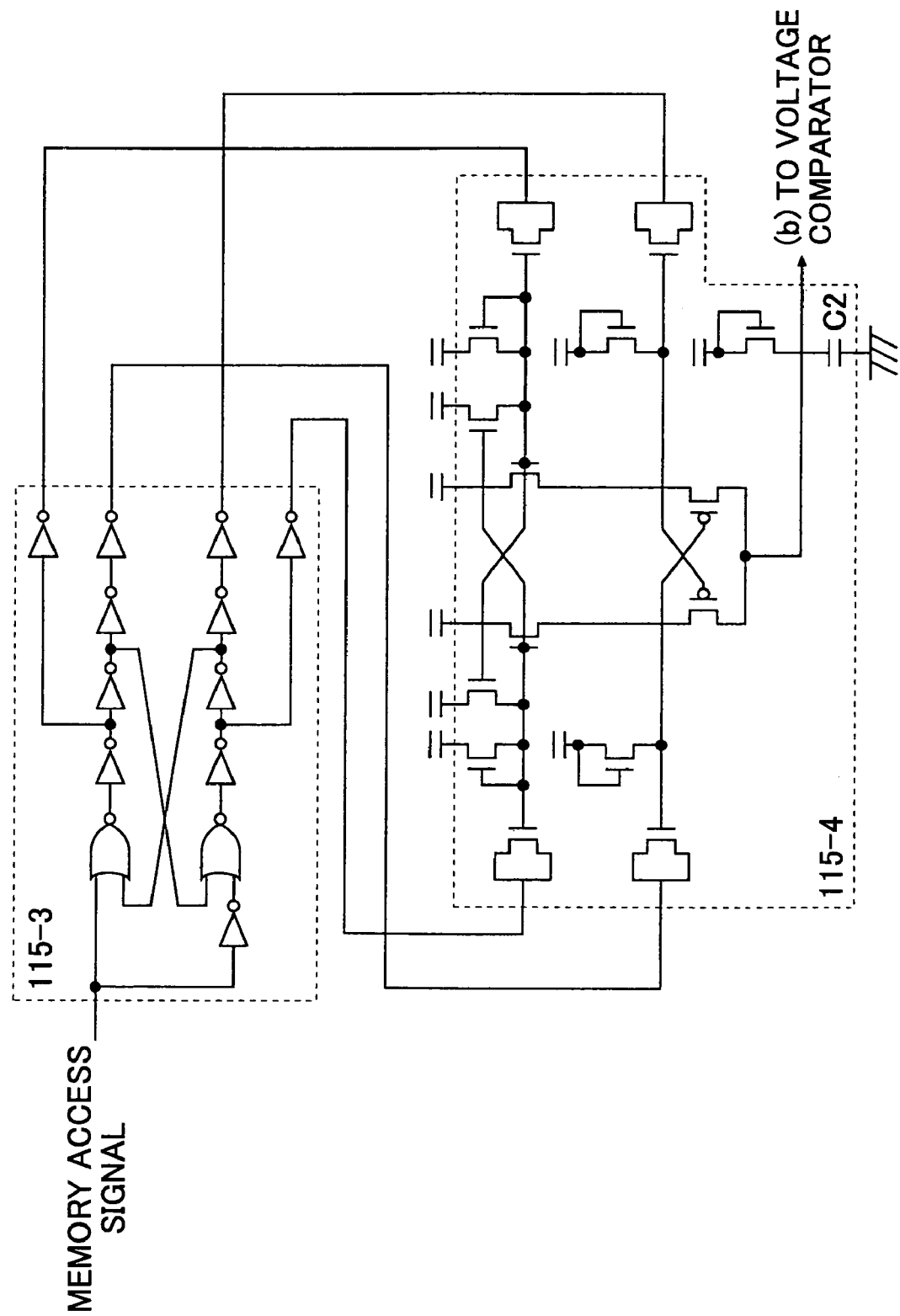
FIG. 7 is a circuit diagram showing a configuration example of a ring oscillator circuit and the pumping circuit shown in FIG. 5.
Figure 8:
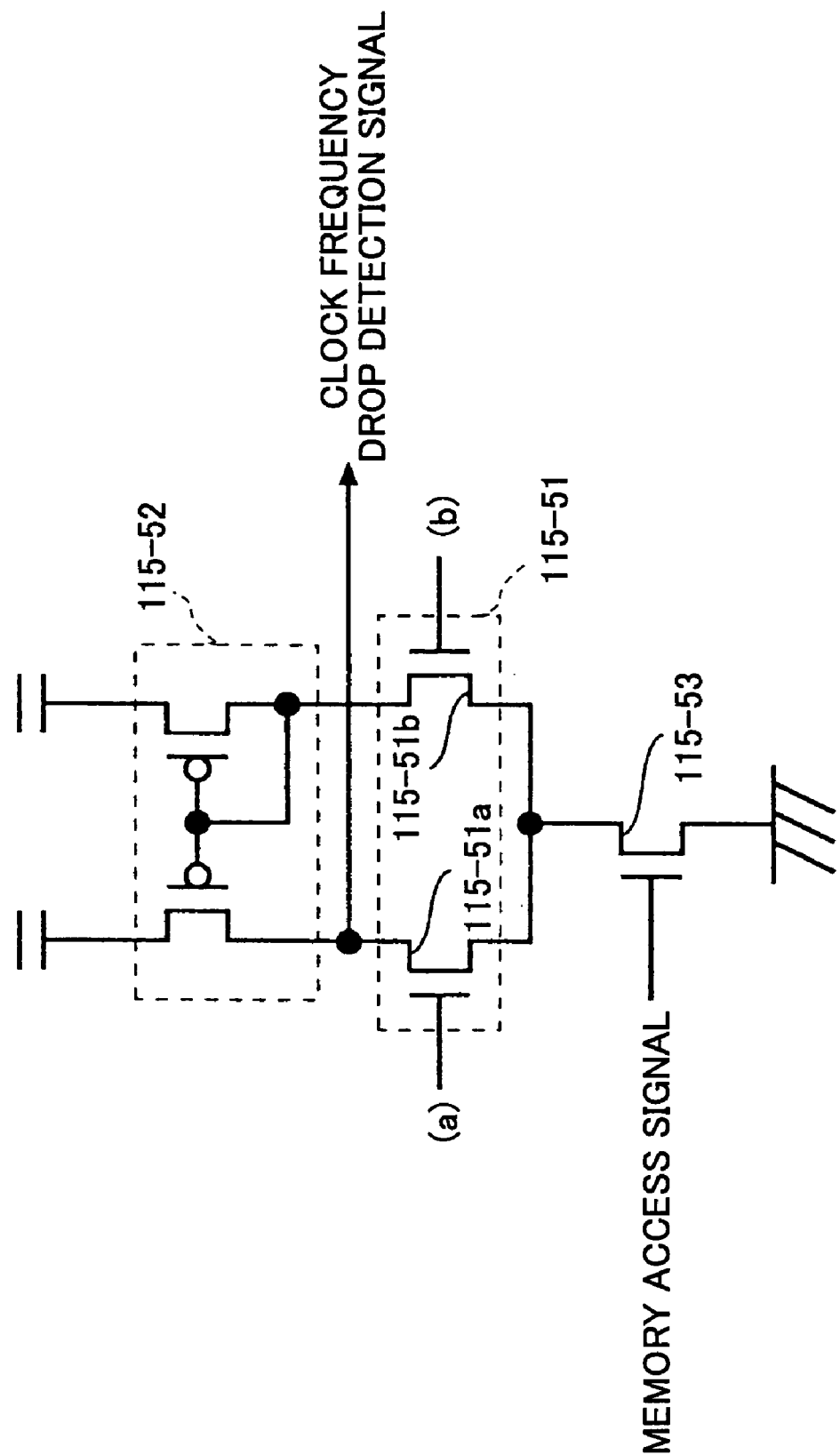
FIG. 8 is a circuit diagram showing a configuration example of a voltage comparator shown in FIG. 5.

In reference to FIGS. 5 through 8, in the clock frequency drop detector 115, the system clock signal that is input is buffer-processed, including delay, by an input-buffer circuit 115-1 (FIG. 6), and is converted into a direct current voltage by a pumping circuit (charge pump circuit) 115-2 according to the clock frequency (i.e., a capacitor C1 shown in FIG. 6 is charged). The voltage (a) shown in FIG. 5 and FIG. 6 of the capacitor C1 is provided to the gate of an NMOS transistor 115-51$a$ (FIG. 8) of a differential amplifying circuit 115-51 of a voltage comparator 115-5 shown in FIG. 5 and FIG. 8. Further, a signal generator 115-3 shown in FIG. 5 and FIG. 7 outputs a signal of a predetermined frequency based on the memory-access signal that is input. The signal of the predetermined frequency is input to a pumping circuit (charge pump circuit) 115-4, and is converted to a direct current voltage according to the frequency (i.e., a capacitor C2 shown in FIG. 7 is charged). A voltage (b), which is shown in FIG. 5 and FIG. 7, of the capacitor C2 is provided to the gate of an NMOS transistor 115-51$b$ (FIG. 8) of the differential amplifying circuit 115-51 of the voltage comparator 115-5.

Here, the differential amplifying circuit 115-51 includes a current mirror circuit 115-52 consisting of NMOS transistors, the gates of which are connected to the drain side of an NMOS transistor 115-51b, the mirror circuit 115-52 serving as a load resistance. In this manner, the voltage comparator 115-5 shown in FIG. 8 determines whether the system clock signal frequency is lowered, only when a direct current voltage (b) is provided to the gate of the NMOS transistor 115-51b.

Furthermore, the voltage comparator 115-5 includes an NMOS transistor 115-53 on the source side (GND side) of the differential amplifying circuit 115-1. To the gate of the NMOS transistor 115-13, the memory-access signal is provided. Only when the memory-access signal is input, the clock frequency drop detection signal is output.

Low-Power Mode Entry Circuit 116

The supply voltage drop detection signal output from the supply voltage drop detector 114 and the clock frequency drop detection signal output from and the clock frequency drop detector 115 are provided to a low-power mode entry circuit 116 shown in FIG. 2. In the following, a configuration example of the low-power mode entry circuit 116 and an example of operations are explained with reference to FIG. 9.

Figure 9:
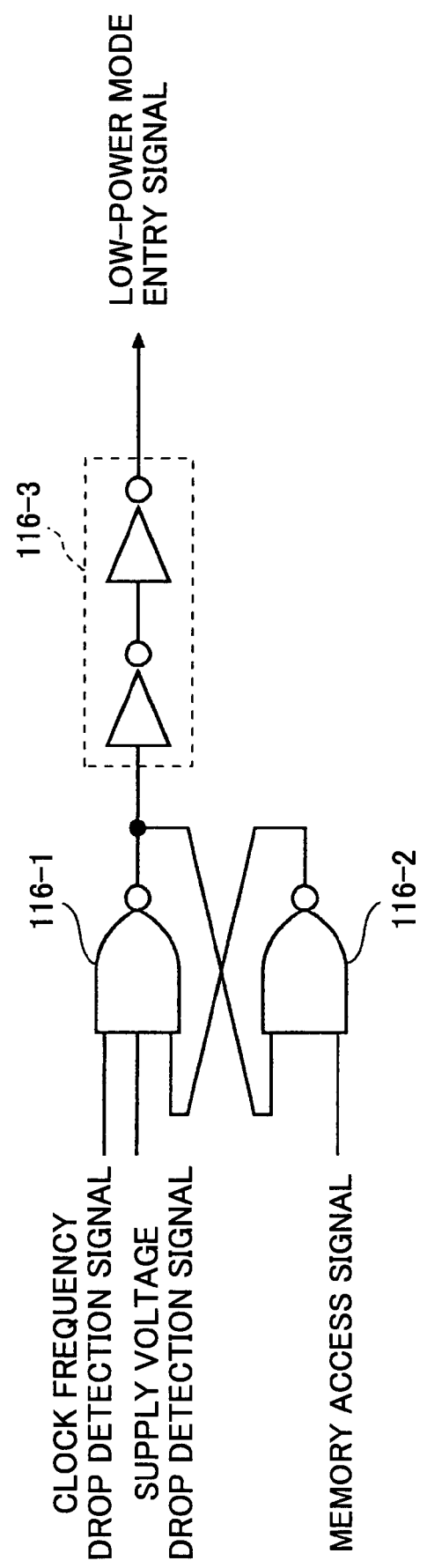
FIG. 9 is a circuit diagram showing a configuration example of a low-power mode entry circuit shown in FIG. 2.

As shown in FIG. 9, the low-power mode entry circuit 116 according to the embodiment includes NAND gates 116-1 and 116-2. When both the clock frequency drop detection signal and the supply voltage drop detection signal are input, a low-power mode entry signal is output through a buffer circuit 116-3.

Further, the example shown in FIG. 9 is configured such that the memory-access signal is also input, without which the low-power mode entry signal is not output. In this manner, when there is no access to the memory, the low-power mode entry signal is prevented from being output, and useless power consumption is avoided.

Timing Adjustment Circuit 120

Figure 10:
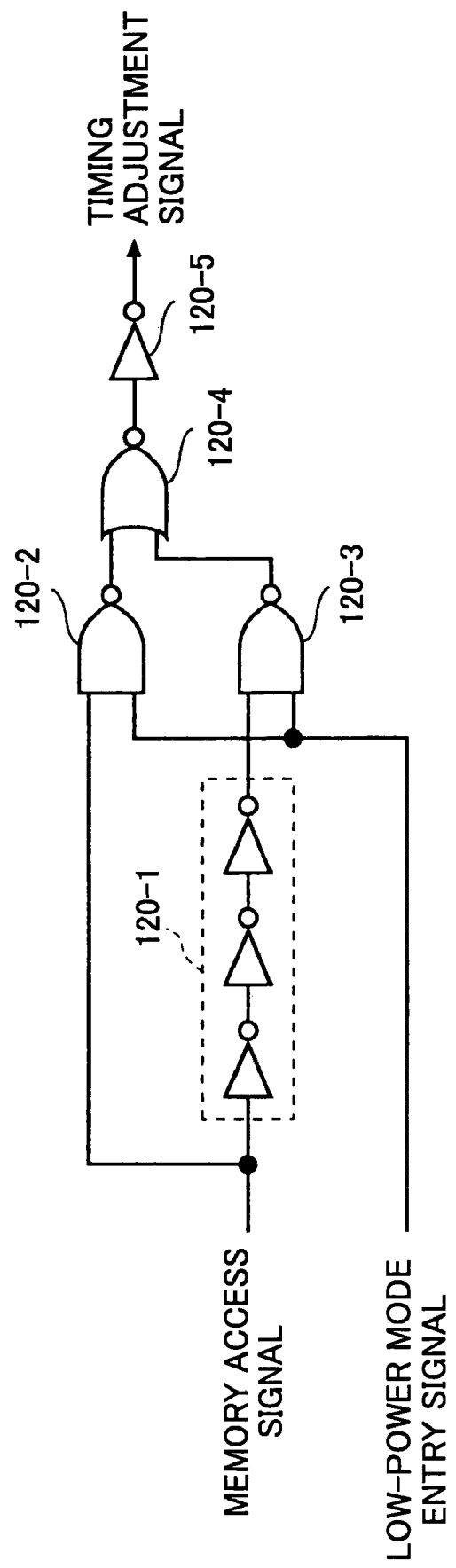
FIG. 10 is a circuit diagram showing a configuration example of a timing adjustment circuit shown in FIG. 2.

A configuration example of a timing adjustment circuit 120 that operates based on the low-power mode entry signal that is output as described above is explained with reference to the circuit diagram of FIG. 10.

The timing adjustment circuit 120 includes a buffer circuit 120-1, NAND gates 120-2, and 120-3, a NOR gate 120-4, and an inverter 120-5. When the low-power mode entry signal is input, the timing adjustment circuit 120 outputs a timing adjustment signal for delaying the timing of internal operations of the memory 100. In the case of the example shown in FIG. 10, a buffer circuit 120-1 consisting of an odd number of inverters is further included for delaying the memory-access signal by a predetermined period. In this manner, a signal for adjusting timing (timing adjustment signal) is generated at a desired timing.

By providing the timing adjustment circuit 120, the embodiment can further reduce the internal voltage supplied to a word line selection drive circuit 101c (FIG. 2).

Internal Voltage Adjustment Circuit 130

Next, a configuration example of an internal voltage adjustment circuit 130 that also operates based on the low-power mode entry signal is explained with reference to the circuit diagram of FIG. 11.

Figure 11:
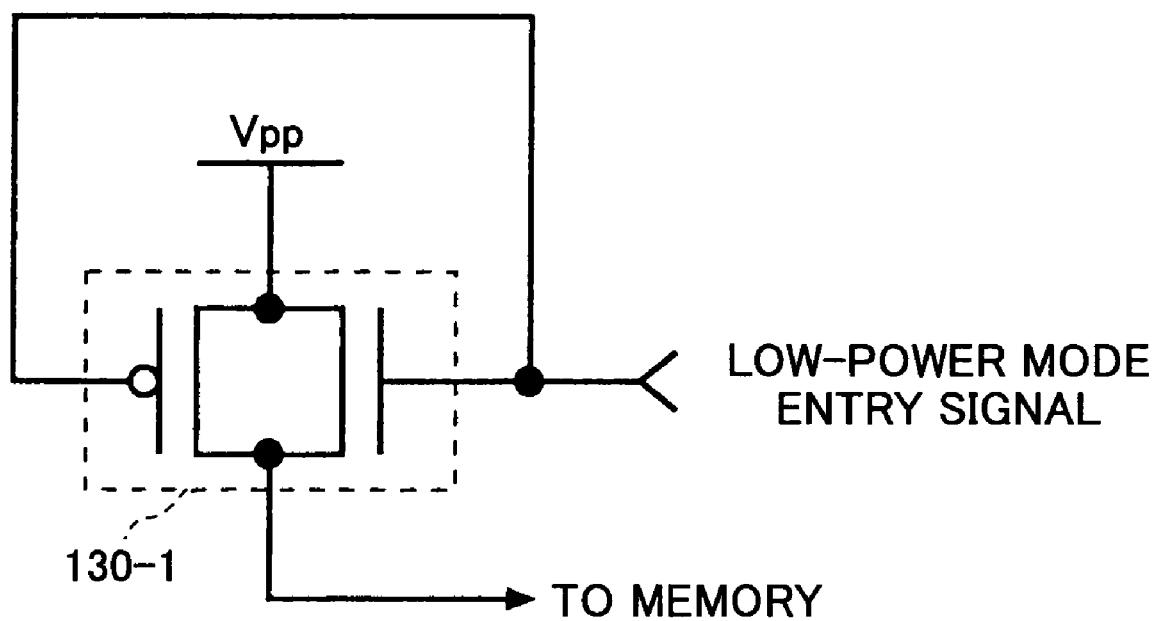
FIG. 11 is a circuit diagram showing a configuration example of an internal voltage adjustment circuit shown in FIG. 2.

The internal voltage adjustment circuit 130 shown in FIG. 11 includes a transistor circuit 130-1 consisting of a PMOS transistor and an NMOS transistor. The low-power mode entry signal is provided to the gate of the two transistors. When the low-power mode entry signal is provided, the NMOS transistor is turned on and the PMOS transistor is turned off. The PMOS transistor has a drive capacity higher than the NMOS transistor. Accordingly, when the PMOS transistor is turned on (i.e., normal operations), an internal voltage Vpp is supplied to the memory core almost as it is. On the other hand, when the NMOS transistor is turned on (i.e., at the time of entering the low-power mode), an internal voltage lower than at the time of normal operations is supplied to the memory core.

Accordingly, by providing the internal voltage adjustment circuit 130, the supply voltage provided to the memory 100, while a high-speed operation is not required because the IP 300 is in the idle status, is lowered, and power consumption is reduced.

Memory Substrate Voltage Adjustment Circuit 140

Next, a memory substrate voltage adjustment circuit 140 according to the embodiment is explained.

In this embodiment, the memory substrate voltage adjustment circuit 140 is a circuit for raising the substrate voltage VBB in the low-power mode operations.

Generally, when the supply voltage to the memory is lowered in the low-power mode operations, the problem is that the required threshold voltage of the NMOS transistor becomes high, especially when the substrate bias is set pursuant to conventional practices. Accordingly, the memory substrate voltage adjustment circuit 140 is provided in order to solve this problem.

Figure 12:
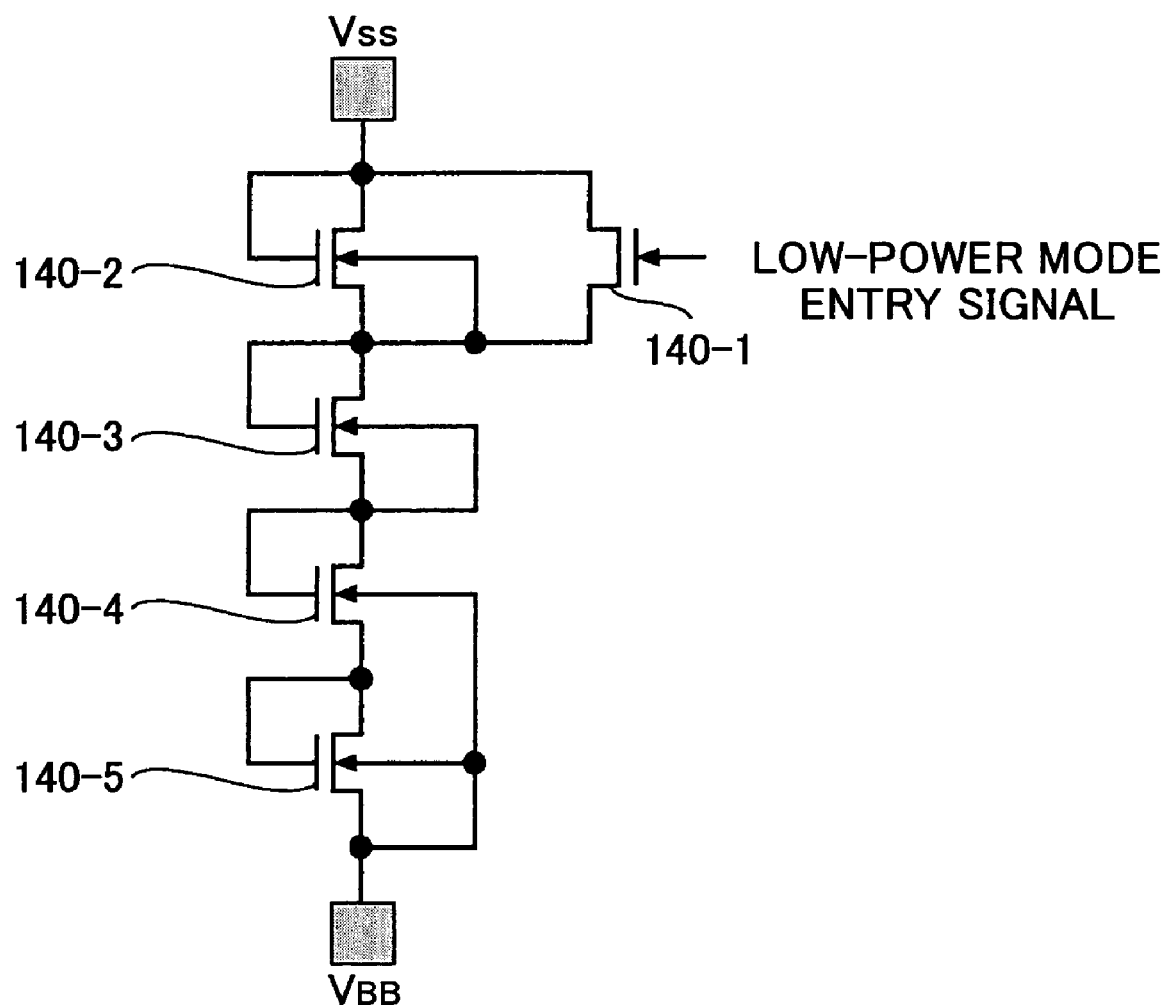
FIG. 12 is a circuit diagram showing a configuration example of a memory substrate voltage adjustment circuit shown in FIG. 2.

An example of the circuit arrangement of the memory substrate voltage adjustment circuit 140 is shown in FIG. 12. With reference to FIG. 12, the memory substrate voltage adjustment circuit 140 includes a plurality of NMOS transistors 140-2 through 140-5 connected in series (a four-step configuration), and an NMOS transistor 140-1 connected in parallel with the NMOS transistor on the side of VSS. The low-power mode entry signal is provided to the gate of the NMOS transistor 140-1. When the NMOS transistor 140-1 is turned on, the four-step configuration of the NMOS transistors between VSS-VBB serves as a three-step configuration. In this manner, the substrate voltage VBB is raised.

Further, the configuration of the memory substrate voltage adjustment circuit 140 shown in FIG. 12 is capable of quickly resuming the substrate voltage VBB for the normal operations when the low-power mode entry signal is not provided, or when the low-power mode entry signal is removed.

Timing Chart in Normal Operation Mode and Low Power Operation Mode

Next, waveforms of each signal for normal mode operations and low-power mode operations are explained with reference to FIG. 13. The following explanation describes the case where the operation mode is changed to the low-power mode when both the system power voltage and the system clock signal frequency are lowered.

Figure 13:
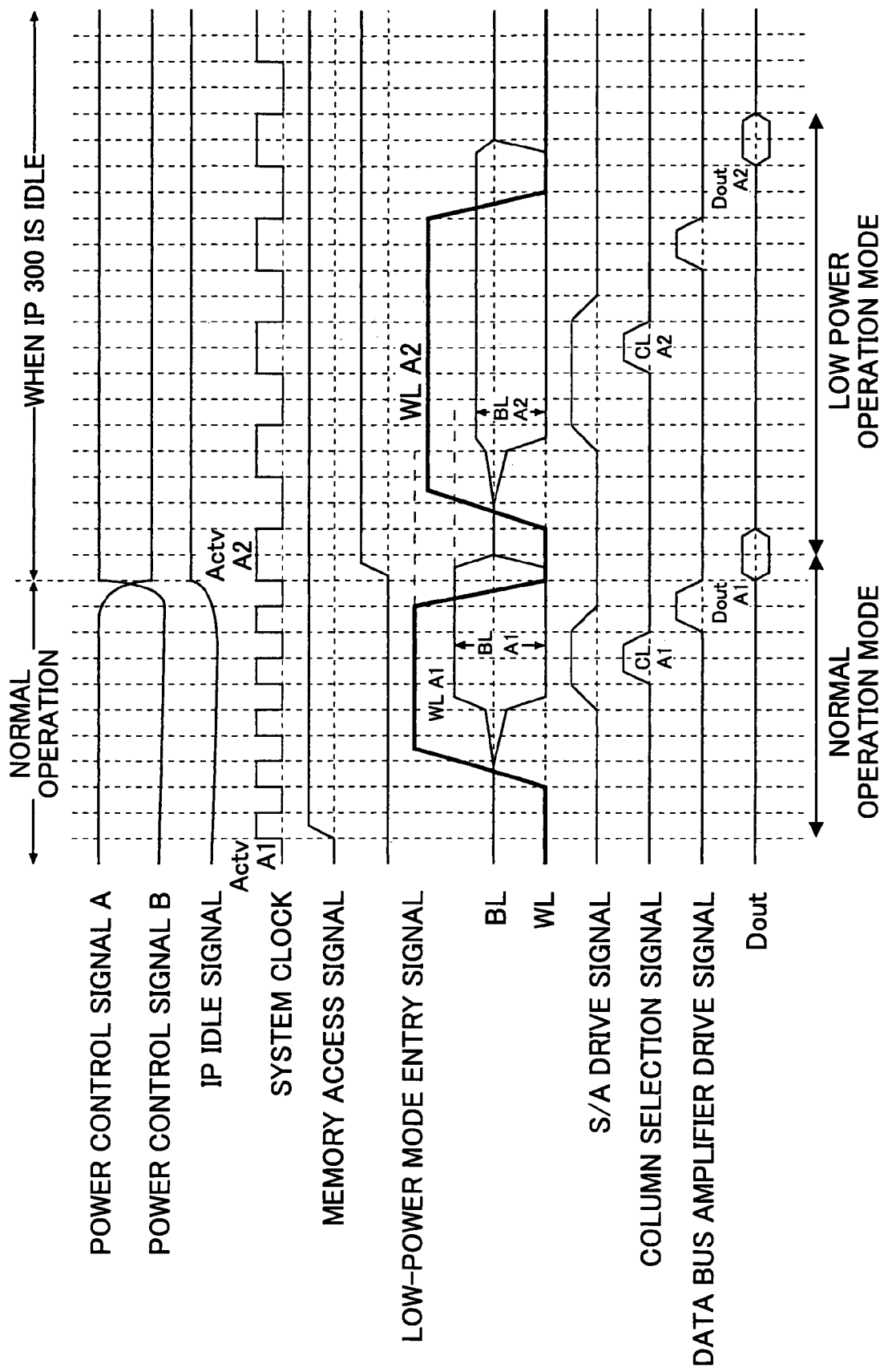
FIG. 13 is a timing chart showing operations of the first embodiment of the present invention.

When the IP 300 outputs an IP idle signal, then the CPU 400 determines that the IP 300 is in the idle state, and lowers the power supply power control signal A, and raises the power supply power control signal B, such that the system power voltage is reduced as shown in FIG. 13. Further, similarly, the CPU 400 lowers the clock frequency of the system clock signal by bringing down the clock control signal C, and by raising the power supply power control signal B. FIG. 13 shows an example wherein the clock frequency of the system clock signal frequency is lowered to one half.

As described above, the supply voltage drop detector 114 and the clock frequency drop detector 115 detect the system power voltage and the system clock signal frequency, respectively, being lowered, and the low-power mode entry signal is output from the low-power mode entry circuit 116.

Here, the internal voltage Vpp output from the internal voltage adjustment circuit 130, where the low-power mode entry signal is input, is lower than the internal voltage Vpp in the normal operation mode. For this reason, a voltage (WL A2) provided to a word line (word line of the memory cell array 101a shown in FIG. 2) that is based on the reduced internal voltage Vpp is also lowered as compared with a voltage (WL A1) that is provided in the normal mode operations as shown in FIG. 13. Similarly, a voltage (BL A2) provided to a bit line in the low-power mode operations is lowered as compared with a voltage (BL A1) provided in the normal mode operations as shown in FIG. 13.

The above explanation is in reference to changing the operation mode to the low-power mode. Resuming the normal operation mode is realized as follows. The CPU 400 detects that the IP 300 starts operating, based on which the system power voltage and the system clock signal frequency are returned to the values for the normal operations. The resumption is detected by the supply voltage drop detector 114 and the clock frequency drop detector 115, based on which the low-power mode entry signal that is output from the low-power mode entry circuit 116 is suspended.

As described above, the present embodiment not only lowers the system power voltage, but also changes the operation mode of the memory 100 from the normal operation mode to the low-power operation mode when the IP 300 is in the idle state, and operations are carried out with minimum required power consumption.

Furthermore, according to the present embodiment, the timing of read-out/writing from/to the memory cell array 101a is adjusted so that the internal voltage Vpp is further reduced, realizing reduction of the power consumption.

Further, according to the present embodiment, the substrate voltage VBB is raised in order to solve the problem wherein the threshold of the transistor on the memory substrate, especially a NMOS transistor, goes up due to the lower system power voltage.

In the above, the first embodiment of the present invention is explained. In summary, the configuration is such that both the operating voltage and the system clock signal frequency (timing of operations) of the memory 100 are lowered when the memory 100 detects that the IP 300 is in the idle state. Nevertheless, the configuration may theoretically be such that only one of the operating voltage and the system clock signal frequency is lowered.

Further, although the first embodiment as described above is constituted such that the CPU 400 and the IP 300 access the memory 100 (more accurately put, access the DRAM controller 200 for controlling transmission to and reception of data from the memory 100) through the same bus 900, the present invention is not limited to this configuration but can be applied to any system where two or more information processors use the same bus.

Furthermore, although the memory 100 is described as SDRAM, memory of other types can be used.

The Second Embodiment

Next, the second embodiment of the present invention is explained.

In the case of the first embodiment, the change of the operation mode of the memory 100 to the low power mode is based on the detection result of the detection means (the supply voltage drop detector 114 and the clock frequency drop detector 115) prepared in the memory 100. In contrast, according to the second embodiment of the present invention, this change is carried out based on a command that is output from the CPU 400.

The Change of the Operation Mode of Memory 100A

Figure 14:
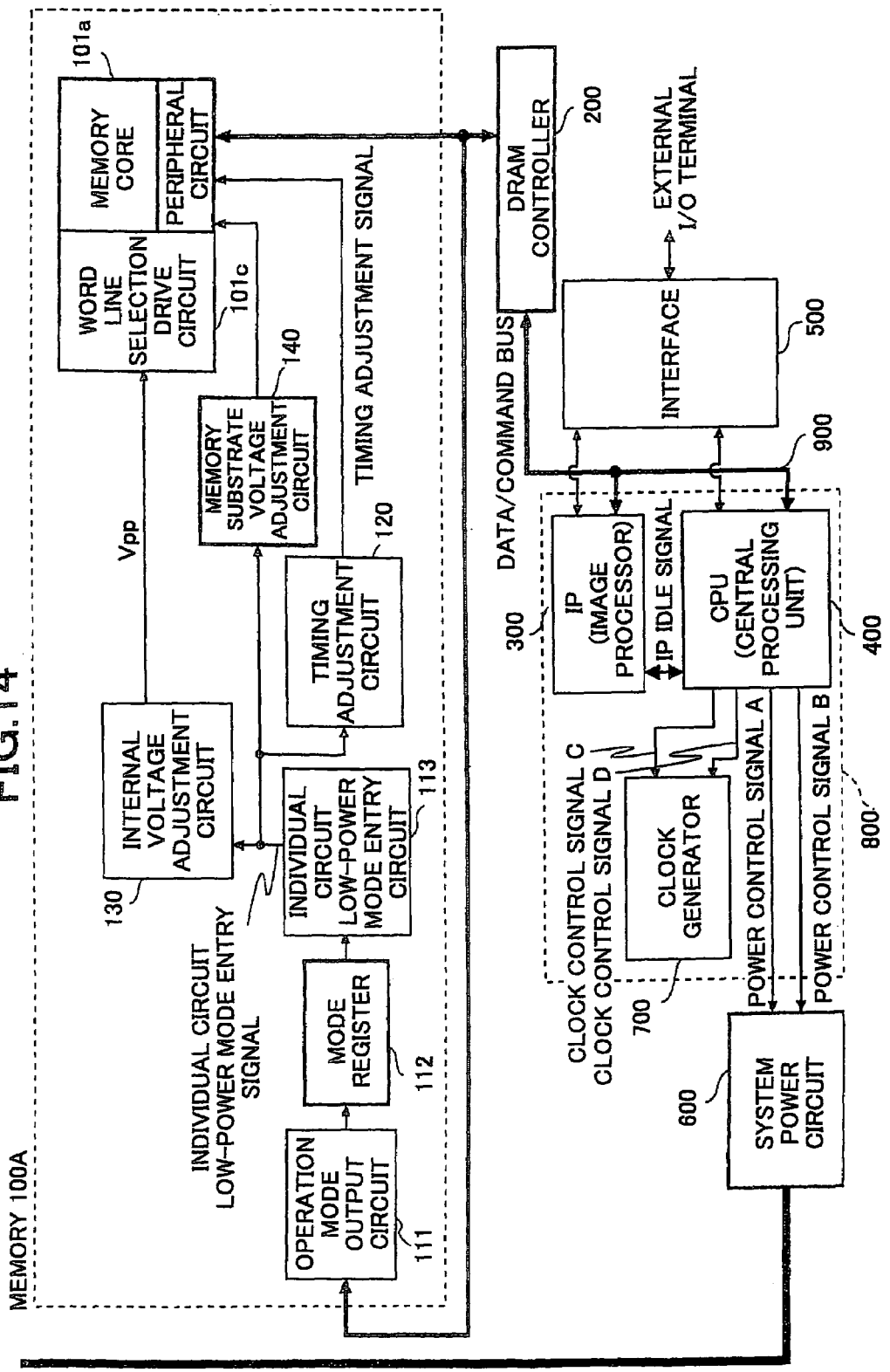
FIG. 14 is a block diagram showing the configuration of a second embodiment of the present invention.

FIG. 14 is a block diagram showing a configuration example according to the second embodiment.

With reference to FIG. 14, when the idle state of the IP 300 is detected, the CPU 400 provides an entry command for changing to the low power operation mode (henceforth the low-power mode entry command) to a memory 100A through the DRAM controller 200. Here, the configuration and the method for detecting the idle state of the IP 300 are the same as those of the first embodiment. Further, an address code (hereafter called the target circuit address code) that indicates which of the circuits (in FIG. 14, the timing adjustment circuit 120, the internal voltage adjustment circuit 130, and the memory substrate voltage adjustment circuit 140, hereafter abbreviated as "120, 130, and 140") are to be set for the low power operation mode is also provided to the memory 100A from the CPU 400.

The low-power mode entry command and the target circuit address code provided to the memory 100A are then provided to an operation mode output circuit 111. The operation mode output circuit 111 includes a command decoder and an address buffer.

According to this configuration, the low-power mode entry command provided by the CPU 400 is decoded by the command decoder, and is provided to a mode register 112 that is prepared in the later stage. Further, the target circuit address code provided by the CPU 400 is then provided to an address buffer, is converted into an address (henceforth the target circuit address) assigned to the target circuits (120, 130, and 140) of the memory 10A, and is provided to the mode register 112 with the low-power mode entry command that is decoded (henceforth called the low power operation mode set command).

The mode register 112 holds the operation mode set to each circuit (120, 130, and 140) of the memory 10A. In this manner, the low-power mode operation set command provided by the operation mode output circuit 111 is set to the address corresponding to the target circuit address of the mode register 112.

Further, if any of the circuits (120, 130, and 140) (target circuit) is set to the low-power mode operation by the mode register 112, an individual circuit low-power mode entry circuit 113 outputs a low-power mode entry signal to the corresponding target circuit. Here, the detection of the operation mode of each circuit (120, 130, and 140) by the individual circuit low-power mode entry circuit 113 can also be realized by configuring so that the individual circuit low-power mode entry circuit 113 continuously or periodically refers to the mode register 112, or by configuring so that a predetermined signal is output to the individual circuit low-power mode entry circuit 113 from the mode register 112 whenever the setup in the mode register 112 is updated. Nevertheless, the configuration can be modified as long as it is possible to detect the operation mode that the individual circuit low-power mode entry circuit 113 sets to each of the circuits (120, 130, and 140).

According to the configuration described above, the individual circuit low-power mode entry circuit 113 outputs the individual circuit low-power mode entry signal to the corresponding circuit (120, 130, and 140), according to the set-up in the mode register 112 of the low-power mode operations for each of the circuits (120, 130, and 140). In this manner, the circuits (120, 130, and 140) reduce power consumption, if the individual circuit low-power mode entry signal is provided.

Since the configuration and operations of the timing adjustment circuit 120, the internal voltage adjustment circuit 130, and the memory substrate voltage adjustment circuit 140 are the same as those described in reference to the first embodiment, explanations are omitted here. However, in the second embodiment, the individual circuit low-power mode entry signal is provided to each of the circuits (120, 130, and 140).

Further, although the above-mentioned explanation is about changing the operation mode to the low power operation mode, changing the operation mode to the normal operation mode is carried out in a manner similar to the above with the individual circuit low-power mode entry command being replaced with an individual circuit normal mode entry command (a command for changing to the normal operation mode for each circuit).

As described above, like the first embodiment, the second embodiment of the present invention realizes operations with minimum required power consumption by preparing the normal operation mode and the low power operation mode.

Furthermore, according to the present embodiment, the timing of read-out/writing from/to the memory cell array 101a is adjusted, and in this manner, further reduction of the internal voltage Vpp is realized, reducing the power consumption.

Further, according to the present embodiment, the substrate voltage VBB is raised so that the problem due to the threshold of the transistor on the memory substrate, especially a NMOS transistor, being raised corresponding to the drop of the system power voltage is solved.

Further, since the operation mode is changed by the command according to the present embodiment, an advantage that the operation mode can be individually set to each of the circuits (120, 130, and 140) is realized.

Furthermore, since the operation mode is changed by the command according to the present embodiment, even when a circuit (such as an LSI) that is asynchronous to the system clock signal is included in the electronic apparatus, entering the power consumption operation mode can be carried out, and reduction of the power consumption is realized. That is, even when the memory 100A in FIG. 14, for example, operates asynchronously to the system clock signal, reduction of the power consumption by the memory 100A is realized by using the command.

The Third Embodiment

Next, the third embodiment of the present invention is explained with reference to the attached drawings.

Figure 15:
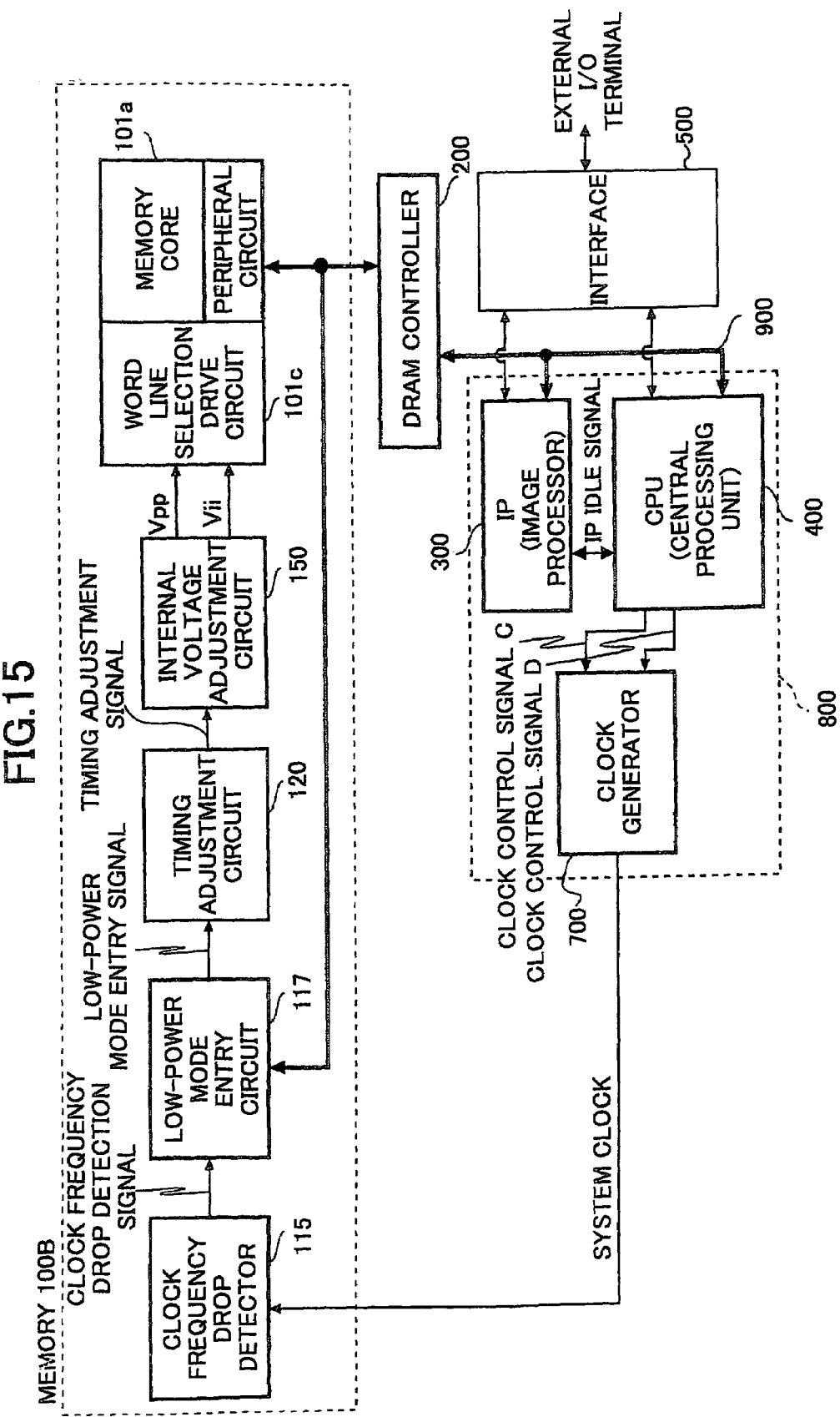
FIG. 15 is a block diagram showing the configuration of a third embodiment of the present invention.

FIG. 15 is a block diagram showing the configuration of the third embodiment of the present invention. As shown by FIG. 15, the present embodiment is configured such that the change of the operation mode is performed based on the detection result of the clock frequency drop detector 115. Here, the clock frequency drop detector 115 shown in FIG. 15 is the same as described in reference to the first embodiment.

Accordingly, when the CPU 400 detects that the IP 300 is in the idle state, and the system clock signal frequency is lowered, the clock frequency drop detector 115 detects the idle state, and the clock frequency drop detection signal is provided to the low-power mode entry circuit 117 that is prepared in a later stage.

Further, when the clock frequency drop detection signal is input, the low-power mode entry circuit 117 outputs the low-power mode entry signal to the timing adjustment circuit 120 that is prepared in the later stage, and makes a memory 100B operate in the low power operation mode.

Further, according to the present embodiment, the low-power mode entry circuit 117 is connected to the IP 300 and the CPU 400 through the DRAM controller 200, as shown in FIG. 15. In this manner, according to the present embodiment, based on the input provided by the IP 300 or the CPU 400, (1) the memory 100B is shifted to the low power operation mode, (2) the memory returns from the low power operation mode, and (3) the shift to the low power operation mode is restricted.

For example, (1) in order to shift to the low power operation mode based on an input provided by the IP 300 or the CPU 400, the IP 300 may directly provide the signal for shifting to the low power operation mode to the low-power mode entry circuit 117 through the DRAM controller 200 when the IP 300 becomes idle, or the CPU 400 upon detecting the idle state of the IP 300 may provide the signal for shifting to the low power operation mode.

Further, (2) when returning from the low power operation mode, the configuration that is same as (1) above serves the purpose. Here, in this case, the signal output from the IP 300 or the CPU 400 is a signal for returning to the normal operation mode.

Further, in the cases of (1) and (2) above, the configuration can be either such that the operation mode is changed only when the clock frequency drop detection signal is input, or such that the operation mode is changed regardless of the presence of the clock frequency drop detection signal.

Further, (3) restriction of the shift to the low power operation mode is realized by providing a flag for indicating permission/disapproval of the shift to the low power operation mode in the low-power mode entry circuit 117, for example. When the CPU 400 allows the shift, the flag for permission is stored to the low-power mode entry circuit 117; and when the shift is not allowed, the flag for disapproval is stored. Accordingly, the low-power mode entry circuit 117 outputs the low-power mode entry signal when a clock frequency drop detection signal is input on the condition that the permission flag is stored. Further, in this case, the configuration can be such that the CPU 400 sets the flag according to directions that an outside apparatus provides through the interface 500.

Further, if the low-power mode entry circuit 117 provides the low-power mode entry signal, the timing adjustment circuit 120 outputs the timing adjustment signal. Further, the internal voltage generating circuit 150 provides the internal voltage Vpp to the word line selection drive circuit 101c at the timing based on the timing adjustment signal that is input. Further, when the timing adjustment signal is input in this manner, the internal voltage generating circuit 150 outputs a voltage that is lower than the internal voltage Vpp of the normal operation mode.

Thus, according to the present embodiment, since the internal voltage is lowered while adjusting the timing of read-out/writing from/to the memory cell array 101a, the power consumption is further lowered compared to the case wherein only the system clock signal frequency is lowered.

Other Embodiments

The preferred embodiments are described above, wherein the power consumption is reduced by lowering the system power voltage, by lowering the system clock signal, and by reducing the power consumption of the memory. However, the present invention is not limited to these embodiments, but rather, various modifications and implementations without deviating from the scope of the present invention are conceivable.

What is claimed is:

1. An electronic apparatus having a memory that operates in a normal operating mode, consuming normal power, and in a low-power consumption mode, consuming reduced power, and a plurality of information processors that exchange data with said memory through a common bus, comprising:
    a first detection unit configured to detect that any one of said information processors is in an idle status, and
    a unit to lower at least one of a frequency of a clock signal supplied to the memory and a supply voltage supplied to the memory when said first detection unit detects that any one of said information processors is in the idle status, wherein
    the memory with the lowered frequency or lowered supply voltage is accessed by any of the information processors that are not in the idle status.

2. The electronic apparatus as claimed in claim 1, further comprising:
    a second detection unit configured to detect that at least one of a frequency of a clock signal and the supply voltage supplied to said memory is lowered, and
    an entry unit configured to change an operation mode of said memory to the low-power consumption mode when said second detection unit detects that at least one of said frequency and said supply voltage is lowered.

3. An electronic apparatus having a memory that operates in a normal operating mode, consuming normal power, and in a low-power consumption mode, consuming reduced power, and a plurality of information processors that exchange data with said memory through a common bus, comprising:
    a detection unit configured to detect that any one of said information processors is in an idle status,
    a low-power mode entry command output unit configured to supply said memory with a command for changing the operation mode of a part or all of said memory to the low-power consumption mode when said detection unit detects that any one of said information processors is in the idle status, and
    a low-power mode entry unit configured to change the operation mode of said part or all of said memory to the low-power consumption mode based on said command that is output by said low-power mode entry command output unit, wherein
    the memory with the lowered frequency or lowered supply voltage is accessed by any of the information processors that are not in the idle status.

4. A power consumption reduction method for an electronic apparatus wherein a plurality of information processors exchange data with a memory through a common bus, comprising:
    a first step for detecting that any one of said information processors is in an idle status, and
    a second step for lowering at least one of a frequency of said common bus and a supply voltage supplied to the memory when said first step detects that any one of said information processors is in the idle status, wherein
    the memory with the lowered frequency or lowered supply voltage is accessed by any of the information processors that are not in the idle status.

5. The power consumption reduction method as claimed in claim 4, further comprising:
    a third step for detecting that at least one of said frequency and said supply voltage is lowered, and
    a fourth step for lowering an internal voltage of said memory when said third step detects that at least one of said frequency and said supply voltage is lowered.

6. The power consumption reduction method as claimed in claim 4, further comprising:
    a third step for detecting that at least one of said frequency and said supply voltage is lowered, and
    a fourth step for adjusting operations timing of said memory, when said third step detects that at least one of said frequency and said supply voltage is lowered.

7. The power consumption reduction method as claimed in claim 4, further comprising:
    a third step for detecting that said supply voltage is lowered, and
    a fourth step for increasing a voltage supplied to a substrate of said memory by a predetermined amount when said third step detects that said supply voltage is reduced.

8. A low-power mode entry method for changing an operation mode of a memory that operates in a normal mode, consuming normal power, and in a low-power mode, consuming reduced power, to the low-power mode, comprising:
    a first step for detecting that at least one of a frequency of a clock signal supplied to said memory and a supply voltage supplied to said memory is reduced, and
    a second step for changing the operation mode of said memory to the low-power mode, when said first step detects that at least one of said frequency and said supply voltage is reduced, wherein
    the memory with the lowered frequency or lowered supply voltage is accessed by any of the information processors that are not in the idle status.

9. A low-power mode entry method that changes an operation mode of a memory that operates in a normal mode, consuming normal power, and in a low-power mode, consuming reduced power, to the low-power mode, and exchanges data with a plurality of information processors, comprising:
    a first step for detecting that any one of said plurality of information processors is in an idle status,
    a second step for outputting to said memory a command for changing the operation mode of a part or all of said memory to the low-power mode when said first step detects that any one of said information processors is in the idle status, and
    a third step for changing said part or all of said memory to the low-power mode based on said command output by said second step, wherein
    the memory with the lowered frequency or lowered supply voltage is accessed by any of the information processors that are not in the idle status.

* * * * *